United States Patent

Pettesch

[11] Patent Number: 5,564,465
[45] Date of Patent: Oct. 15, 1996

[54] FILL RESTRICTING DROP TUBE

[75] Inventor: Martin C. Pettesch, Cranford, N.J.

[73] Assignee: Universal Valve Co., Inc., Elizabeth, N.J.

[21] Appl. No.: 320,292

[22] Filed: Oct. 11, 1994

[51] Int. Cl.⁶ .............................. F16K 31/24; F16K 1/22; F16K 33/00
[52] U.S. Cl. ........................ 137/447; 141/198; 251/308
[58] Field of Search .................... 137/448, 447; 141/198, 205, 213; 251/298, 305, 308

[56] References Cited

U.S. PATENT DOCUMENTS

| 2,355,017 | 8/1944 | Stone | 251/308 |
|---|---|---|---|
| 3,385,562 | 5/1968 | Newell | 251/308 |
| 3,779,511 | 12/1973 | Wenglar | 251/308 |
| 4,667,711 | 5/1987 | Draft | 141/198 |
| 4,986,320 | 1/1991 | Kesterman et al. | 141/198 |
| 4,998,571 | 3/1991 | Blue et al. | 141/198 |
| 5,027,870 | 7/1991 | Butterfield | 141/198 |
| 5,152,315 | 10/1992 | Lagache | 141/198 |
| 5,163,470 | 11/1992 | Maeshiba | 141/198 |
| 5,174,345 | 12/1992 | Kesterman et al. | 141/198 |
| 5,241,983 | 9/1993 | Lagache | 141/198 |

FOREIGN PATENT DOCUMENTS

| 1175074 | 3/1959 | France | 251/308 |
|---|---|---|---|
| 787140 | 12/1957 | United Kingdom | 251/308 |

Primary Examiner—George L. Walton
Attorney, Agent, or Firm—Edward Dreyfus, Esq.

[57] ABSTRACT

A drop tube for underground fuel storage tanks and the like has a flow restriction section that includes a plate or disc mounted for rotation and controlled by a float located outside the section. Unlike overfill shut-off valves that slam against a sealing valve seat and require springs and cams for their operation, the subject restrictor simply and slowly rotates the plate between a non-restricting position and one in which the plate closes off the delivery liquid flow. Since the plate and interior wall of the tube are not sealed, liquid above the restrictor can bleed past the plate into the storage tank after the delivery valve on the truck is closed. Overfill is unlikely because it would take several hours to overfill with the plate in the restricting position.

14 Claims, 4 Drawing Sheets

FILL RESTRICTING DROP TUBE

BACKGROUND

This invention relates to drop tubes and more specifically to a new fill liquid restriction apparatus for such drop tubes.

Riser pipes are used as the main liquid fill lines for fuel storage tanks located below ground at gasoline service stations and the like. The riser pipe is vertically oriented, has its upper end located in a manhole, and its lower end opening towards the inside of the below-ground storage tank. Because it is important to fill fuel storage tanks from the bottom of the storage chamber, drop tubes are inserted through the riser and have their outlet ends positioned near the bottom of the storage chambers. Risers and drop tubes must be dimensioned to accommodate a flow of 340 gallons per minute.

Another function attempted to be performed by drop tubes includes cutting of the delivery flow when the storage tank is nearly full and bleeding into the tank the fuel remaining in the riser and delivery hose after the delivery truck operator closes the valves on the truck. Apparatus purporting to perform these functions include drop tubes fitted with a valve section located near the top of the storage chamber. A float member located outside the drop tube rises as the liquid level approaches the top of the chamber. When the float reaches a predetermined upward position, the float causes a shut-off valve to enter the path of the delivery fuel stream. The force of the stream closes the shut-off valve against a valve seat thus sealing closed the main delivery opening in the drop tube. Additional valves and ports may be provided to bleed the fuel remaining in or thereafter entering the riser pipe either into the storage tank chamber or through a by-pass channel to the lower part of the drop tube.

Many problems arise from the presence of these shut-off valve sections in drop tubes. For example, the valves and their many associated moving springs, cams and pins break or become defective due to the repeated slamming of the valve. Also, operators repeatedly drop their long gauge sticks down through the riser/drop tube and damage the valve seats and perhaps the stick itself.

These problems could lead to the valve remaining in its closed position even when the float falls to its lowest position. In this case the drop tube must be pulled from the tank for repair.

SUMMARY OF EXEMPLARY EMBODIMENT OF PRESENT INVENTION

A drop tube according to the principles of the present invention avoids the aforementioned problems, and provides other and further advantages over the prior art shut-off valve sections.

In one exemplary embodiment a drop tube comprises a flow restriction section located near the top of the tank storage chamber. This section comprises a flow restriction plate or disc mounted on a shaft that extends through the side wall of the section, and a float member is connected to an outside part of the shaft to rotate the disc slowly from a flow-open position to a flow-restriction position in response to the rise of stored liquid level. The disc is sized to substantially completely but not entirely block the flow through the section because the plate fits with but does not seal the section. With flow substantially restricted, the operator is alerted because flow has essentially stopped. He/she then closes the truck delivery valves. Liquid fuel in and entering the riser pipe thereafter can simply bleed by the unsealed space between the disc and section wall toward the bottom of the drop tube.

Thus, a drop tube according to the present invention has relatively few moving parts, no springs, cams or valves of any type, is much more reliable and rugged, and is far less costly and less complex to manufacture than known prior art.

DRAWINGS

Other and further benefits and advantages shall be understood from the following detailed description when taken in view of the appended drawings in which.

DETAILED DESCRIPTION OF EMBODIMENT

Figure 1:
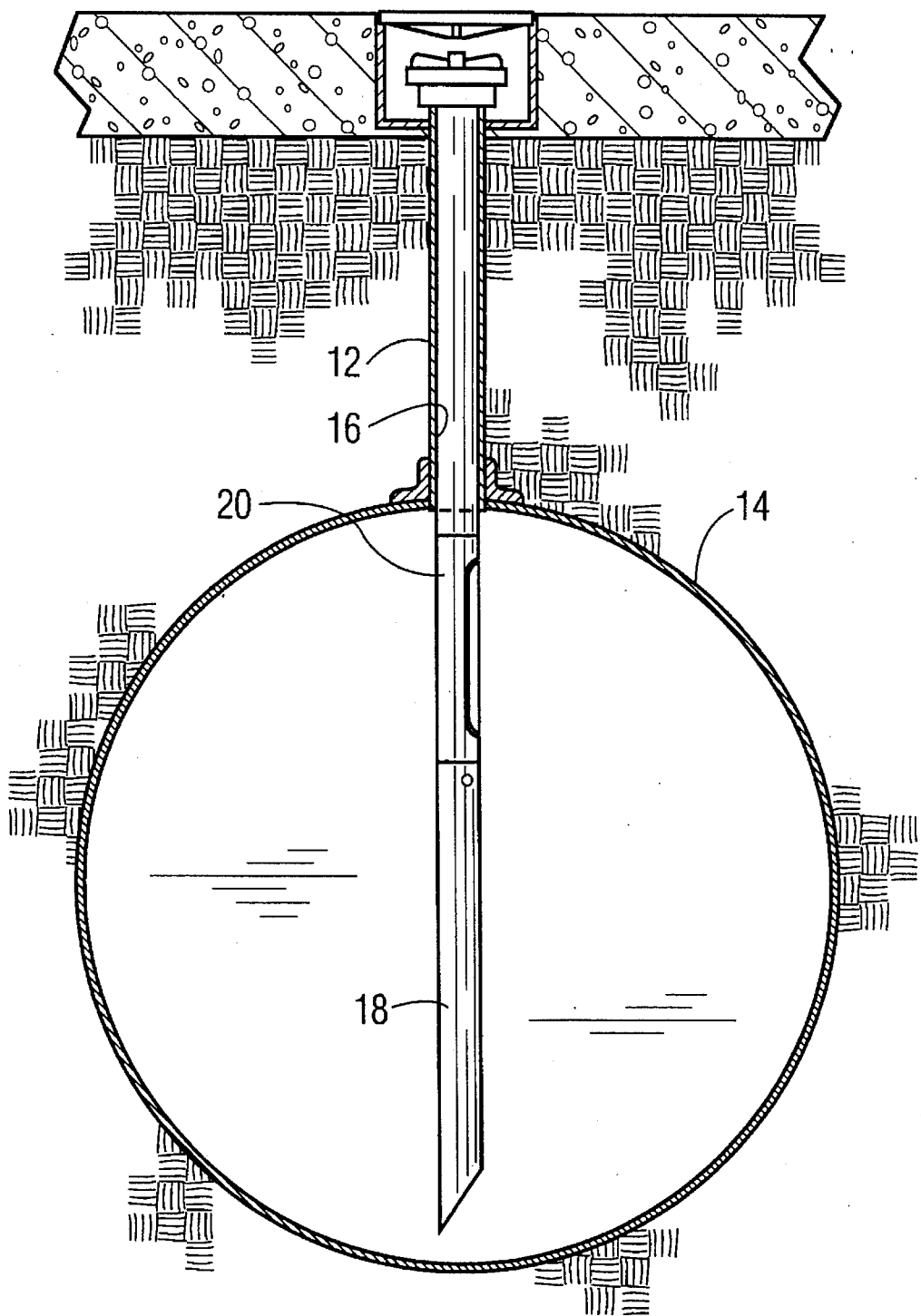
FIG. 1 is a schematic representation of a vertical cross section of a tank, riser pipe and drop tube according to the present invention.
Figure 4:
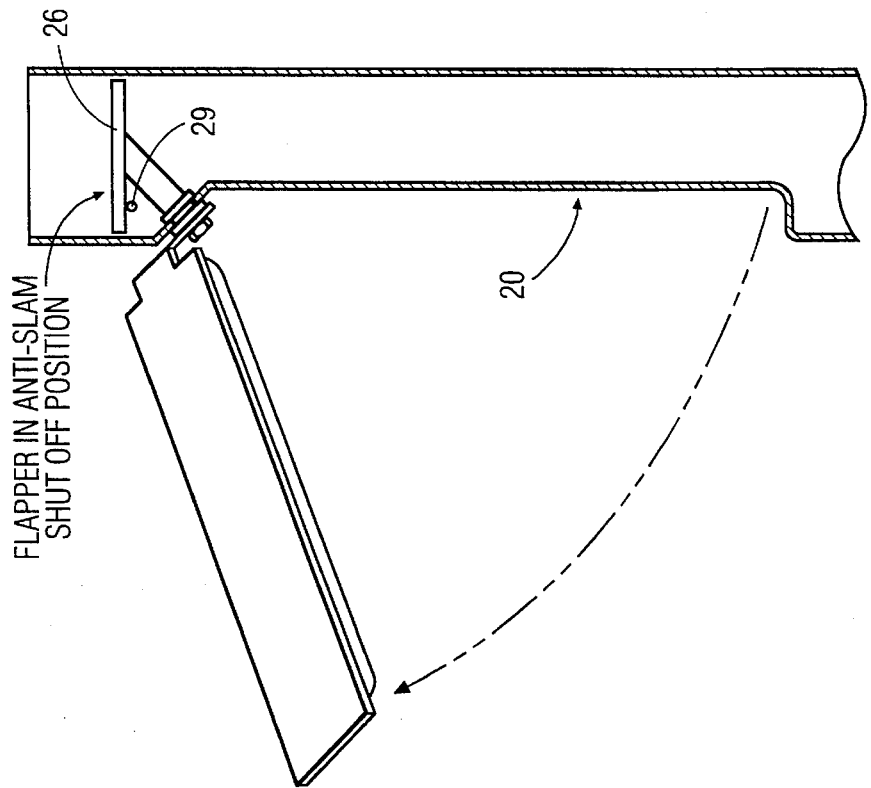
FIGS. 2–4 are partial vertical sections showing the restriction section of the tube 20 with the parts at increasing liquid levels.
Figure 3:
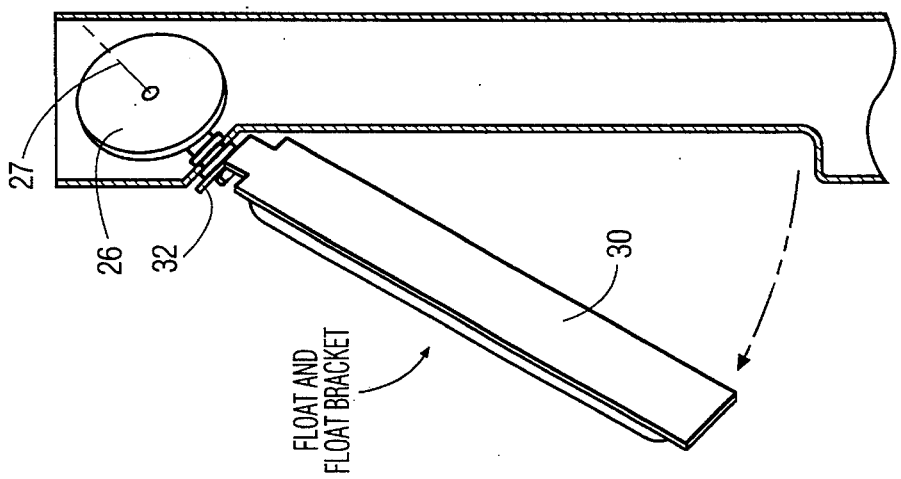
Figure 2:
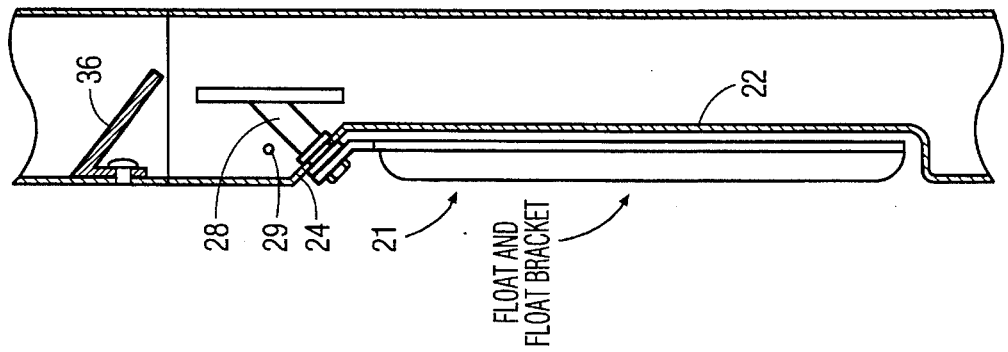
Figure 6:
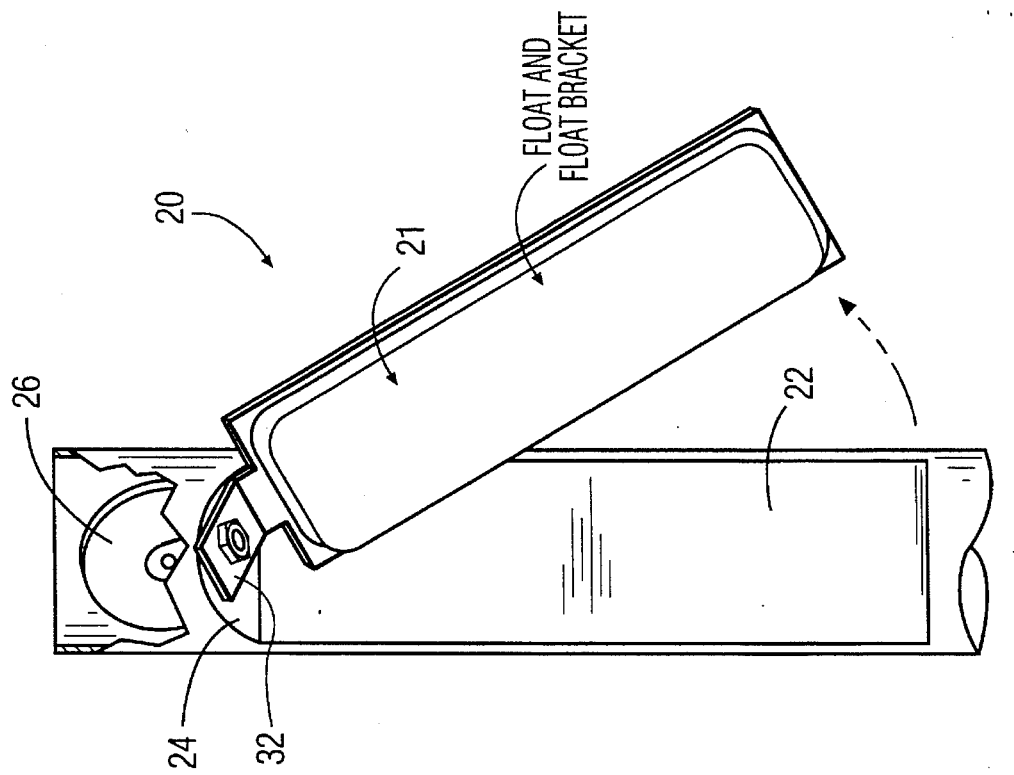
FIGS. 5–7 are side views of FIGS. 2–4, respectively.
Figure 5:
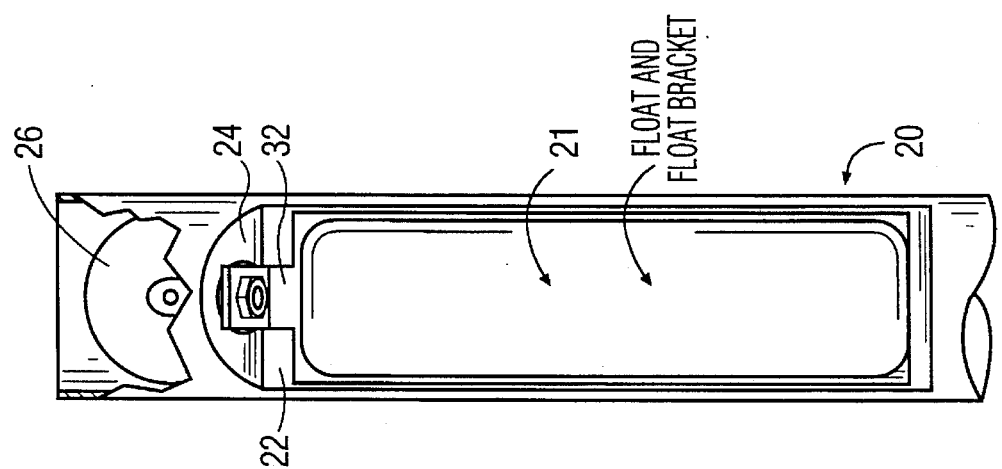
Figure 7:
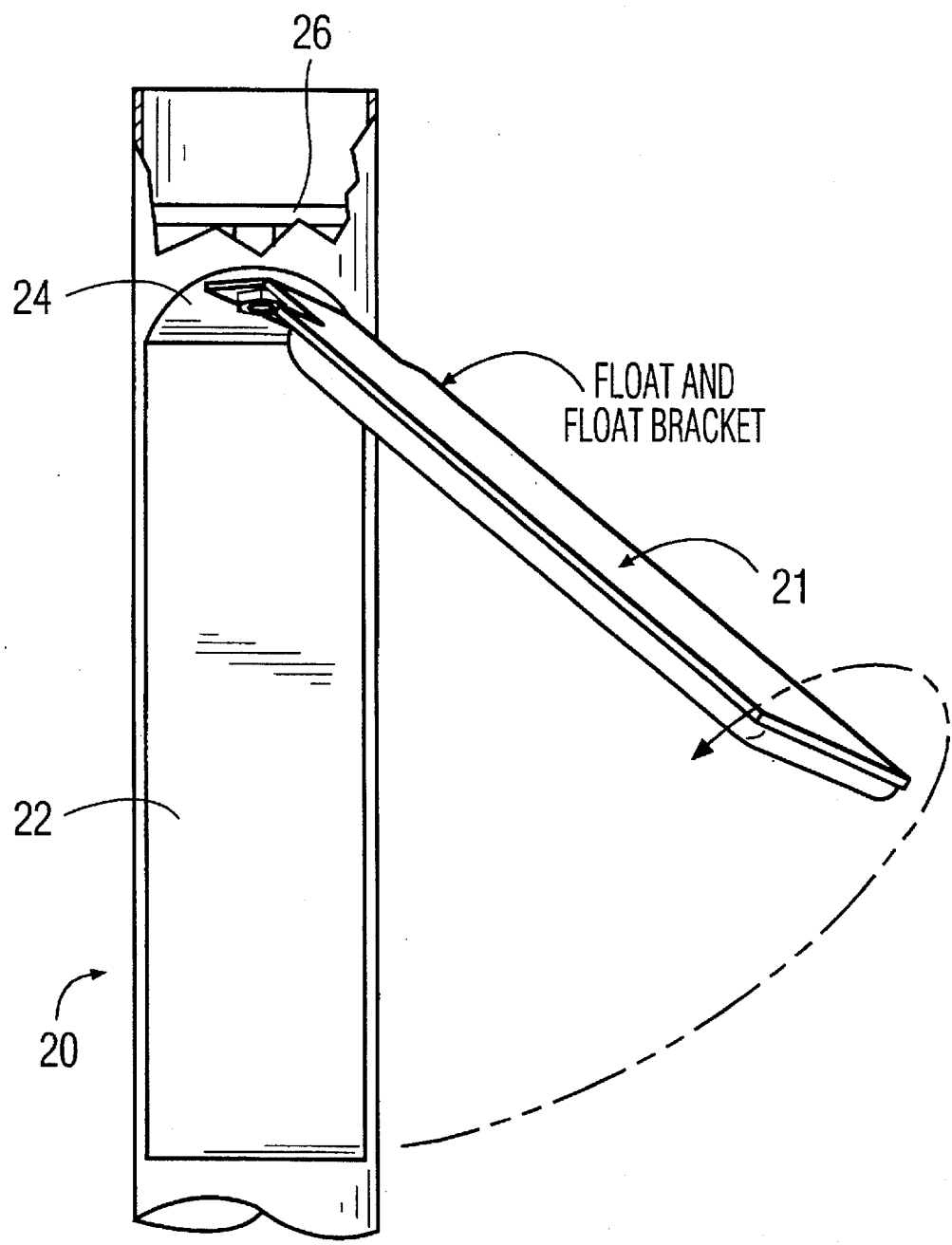

With reference to FIG. 1, a drop tube 10 is dimensioned to insert through riser pipe 12 partially into liquid fuel storage tank 14. The outlet of tube 10 opens into and near the bottom of tank 14. The connection between the drop tube and riser pipe 12 can be of any standard, well-known type.

As can be seen in FIG. 1, tube 10 comprises three sections: an upper part 16 that extends into the riser, a lower part 18 arranged within the storage tank 14, and a flow restriction section 20 that restricts the delivery flow in relation to the rise in stored liquid level as further described below.

Section 20 is shaped to form a recessed wall 22 within the profile of drop tube 10. Wall 22 includes an angular part or beveled plate 24. A flow restriction plate or disc 26 has its center region secured to a metal shaft 28 that penetrates and is held for rotation by wall section 24. A metal float bracket 30 includes an angle piece 32 secured to shaft 28. Float 34 can be made of any suitable material such as closed cell nitril rubber ebonite and is secured to the outer surface of bracket 30 or alternately molded about bracket 30. A gauge stick deflection plate 36 secures to the inside of the section wall above the restriction assembly to deflect gauge stick insertions. It should be understood that the recess and position of the parts enable the drop tube to be inserted or withdrawn from the riser pipe for purposes of installation or repair.

In operation, before filling, the float 21 suspends downward from shaft 28 that holds disc 26 in a vertical alignment, preferably at the center line of tube 10. As liquid fuel flows down tube 10, the flow is essentially unrestricted by disc 26 and shaft 28. As the liquid level rises to a predetermined level, such as 90% capacity of tank 14, float 21 begins to rotate tangentially from the recess. This action in turn rotates disc 26 around its center axis 27 such that the footprint of disc 26 increases across the cross section area of tube section 20, thus reducing or restricting the delivery flow.

As the tank 14 level continues to rise, float 21 rises until disc 26 orients across section 20 and the edge point of disc 26 hits stop pin 29. Disc 26 engages pin 29 somewhat before float 21 reaches its lateral position in order to reduce or hold down the stresses on bracket piece 32.

No seal is provided between disc 26 and the inner wall of section 20. In one example, a 1/64 (one sixty-fourth) inch spacing surrounds the disc 26. Accordingly, liquid above disc 26 continues to bleed past disc 26 toward tube 20 outlet end.

Nevertheless, the operator will note that delivery is substantially restricted and will shut off the valves at the truck. In the event the operator fails to note the restricted delivery, no danger of overfill exists because it would take several additional hours to actually fill tank 14 with disc 26 in the full restricting position.

It will be understood that various changes and modifications can be made to the herein disclosed embodiments without departing from the spirit and scope of the present invention. It will also be understood that the drop tube hereof and the elements of the restriction section can be made of any suitable material such as cast aluminum, steel, or other suitable metal.

I claim:

1. A drop tube including a first section for being at least partially housed in a riser pipe of a fuel storage facility and a second section for being housed in a fuel storage tank chamber, said drop tube further comprising a flow restriction section having a continuous wall defining an up-stream end communicating with said first section and a down stream end communicating with said second section, said restriction section comprising a plate member mounted to and within said wall for rotation about an axis that intersects said wall intersects said plate member within the periphery of said plate member and said axis being at an acute angle to said plate member, control means for rotating said plate member about said axis between a first position in which the plate member is generally aligned with the liquid flow direction in said section when the liquid within the chamber is below a first predetermined level and a second position in which said plate member is oriented generally across the liquid flow direction in said restriction section to substantially restrict the flow in said restriction section when the liquid within the chamber is at a second predetermined level that is higher than the first predetermined level and for rotating said plate member toward said first and toward said second positions in response to the fall and rise, respectively, of the liquid level between the first and second predetermined levels.

2. A drop tube according to claim 1, wherein said control means comprises a float member located outside said wall of said restriction section for moving in response to the rise and fall of liquid between the first and second predetermined levels.

3. A drop tube according to claim 2, wherein said control means comprises a shaft connected to said plate member and said float member and mounted through said wall of said restriction section for rotation about said axis.

4. A drop tube according to claim 5, wherein said float member rotates said shaft in response to the rise and fall of liquid between the first and second predetermined levels.

5. A drop tube according to claim 4, wherein said float member is connected to the external portion of said shaft and rotates about said axis.

6. A drop tube according to claim 5, wherein said axis forms an acute angle with the center axis of the drop tube.

7. A drop tube according to claim 4, wherein said wall of the restriction section defines a cavity in its profile in relation to the upstream and downstream parts of said restriction section, and said float member and shaft external part are positioned completely within said cavity when the plate member is in said first position.

8. A drop tube according to claim 7, wherein said upper part of said cavity includes a wall section for mounting said shaft, said wall section being inclined to form an acute angle relative to the longitudinal axis of the drop tube.

9. A drop tube according to claim 8, wherein said back wall of said cavity is generally parallel with the drop tube longitudinal axis and the float member orients generally parallel to the back wall when said plate member is in said first position.

10. A drop tube according to claim 9, wherein said float member rotates in a direction generally parallel to said cavity back wall when the liquid level first rises above said predetermined first level.

11. A drop tube according to claim 3, wherein said restriction section includes a stop pin for stopping the rotation of said plate member when the plate member reaches the second position.

12. A drop tube according to claim 11, wherein said stop pin contacts said plate member to stop the plate member in the second position is response to the float member reaching a second predetermined position.

13. A drop tube according to claim 1, wherein said plate member periphery is spaced slightly from the internal wall of the restriction section when in said second position so that said plate member closes substantially all but not the entire liquid flow through said restriction section.

14. A drop tube according to claim 1, wherein said axis intersects said plate member substantially at the center point of said plate member so that said plate member is rotatable about said axis and about the substantial center point of said plate member.

* * * * *

UNITED STATES PATENT AND TRADEMARK OFFICE
CERTIFICATE OF CORRECTION

PATENT NO. : 5,564,465
DATED : October 15, 1996
INVENTOR(S) : Martin C. Pettesch It is certified that error appears in the above-indentified patent and that said Letters Patent is hereby corrected as shown below:

Col. 3, line 30, after "wall" insert --and--

Col. 4, line 5, change "5" to "3"

Col. 4, line 38, change "is" to --in--

Signed and Sealed this

Thirty-first Day of December, 1996

Attest:

BRUCE LEHMAN

*Attesting Officer*            *Commissioner of Patents and Trademarks*